(12) United States Patent
Hussain

(10) Patent No.: US 10,650,153 B2
(45) Date of Patent: May 12, 2020

(54) ELECTRONIC DOCUMENT ACCESS VALIDATION

(71) Applicant: Ent. Services Development Corporation LP, Houston, TX (US)

(72) Inventor: Mohammed Hussain, Troy, MI (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 435 days.

(21) Appl. No.: 15/420,958

(22) Filed: Jan. 31, 2017

(65) Prior Publication Data

US 2018/0218133 A1    Aug. 2, 2018

(51) Int. Cl.
| | | |
|---|---|---|
| *G06F 21/62* | (2013.01) | |
| *H04L 29/06* | (2006.01) | |
| *G06F 21/42* | (2013.01) | |

(52) U.S. Cl.
CPC .......... *G06F 21/6209* (2013.01); *G06F 21/42* (2013.01); *H04L 63/108* (2013.01); *H04L 63/101* (2013.01); *H04L 63/18* (2013.01)

(58) Field of Classification Search
CPC ... G06F 21/42; G06F 21/6209; H04L 63/101; H04L 63/108; H04L 63/18
See application file for complete search history.

(56) References Cited

U.S. PATENT DOCUMENTS

| | | | |
|---|---|---|---|
| 8,510,816 B2 | 8/2013 | Quach | |
| 8,654,971 B2 | 2/2014 | Orsini | |
| 9,038,152 B1 * | 5/2015 | Vazquez | H04L 63/08 |
| | | | 726/6 |
| 9,413,587 B2 | 8/2016 | Smith | |
| 10,084,780 B2 * | 9/2018 | Bao | H04W 12/06 |
| 10,110,569 B1 * | 10/2018 | Coelho | H04L 67/06 |
| 2003/0061520 A1 * | 3/2003 | Zellers | H04L 63/083 |
| | | | 726/5 |
| 2009/0119754 A1 * | 5/2009 | Schubert | H04L 63/0853 |
| | | | 726/4 |
| 2009/0228965 A1 * | 9/2009 | Klippgen | H04L 63/08 |
| | | | 726/6 |
| 2011/0197266 A1 * | 8/2011 | Chu | H04L 9/3228 |
| | | | 726/5 |
| 2013/0047223 A1 * | 2/2013 | Headley | H04L 63/0838 |
| | | | 726/5 |
| 2013/0254163 A1 | 9/2013 | Savage | |
| 2013/0312066 A1 * | 11/2013 | Suarez | G16H 40/67 |
| | | | 726/4 |

(Continued)

FOREIGN PATENT DOCUMENTS

WO    WO-2011055002 A1    5/2011

OTHER PUBLICATIONS

Smalser; A.; What is Application Access and Single Sign-on with Azure Active Directory?; https://azure.microsoft.com/en-in/documentation/articles/active-directory-appssoaccess-whatis/; Aug. 15, 2016.

*Primary Examiner* — Trang T Doan
(74) *Attorney, Agent, or Firm* — Sheppard Mullin Richter & Hampton LLP

(57) ABSTRACT

A document management computer system can validate a user with validation codes sent through a plurality of communication modes. The validated user may be provided with access to a stored electronic document.

15 Claims, 3 Drawing Sheets

(56) References Cited

U.S. PATENT DOCUMENTS

| | | | |
|---|---|---|---|
| 2014/0053252 A1* | 2/2014 | Kelsey | H04L 63/06 |
| | | | 726/6 |
| 2014/0189808 A1* | 7/2014 | Mahaffey | H04L 63/083 |
| | | | 726/4 |
| 2015/0006474 A1 | 1/2015 | Halder | |
| 2015/0100503 A1* | 4/2015 | Lobo | G06Q 10/103 |
| | | | 705/301 |
| 2015/0156220 A1* | 6/2015 | Baskaran | G06F 21/6209 |
| | | | 726/1 |
| 2015/0206139 A1* | 7/2015 | Lea | G06Q 20/02 |
| | | | 705/44 |
| 2015/0304849 A1* | 10/2015 | Moon | H04W 12/06 |
| | | | 455/411 |
| 2017/0063736 A1* | 3/2017 | Herger | H04L 51/22 |
| 2018/0007052 A1* | 1/2018 | Quentin | G06Q 20/40975 |
| 2018/0012324 A1* | 1/2018 | Kelts | G06Q 30/018 |

\* cited by examiner

ELECTRONIC DOCUMENT ACCESS VALIDATION

BACKGROUND

Given today's global economy, organizations often have users that are geographically dispersed, and may utilize virtual team collaboration applications to facilitate communication and data sharing between the users for performing job-related tasks and functions. Document management and storage systems are commonly used by organizations to share data between users and perform other functions.

A document management and storage system can facilitate electronic document sharing and collaboration. For example, document sharing functions may allow for a user to create and store a document, and electronically share the document with other users through the document management and storage system. Examples of the document sharing functions may further include searching, archiving, versioning, and other types of document sharing functions.

BRIEF DESCRIPTION OF DRAWINGS

Embodiments are described in detail in the following description with reference to the following figures. The embodiments are illustrated by examples shown in the accompanying figures in which like reference numerals indicate similar elements.

DETAILED DESCRIPTION OF EMBODIMENTS

Figure 1:
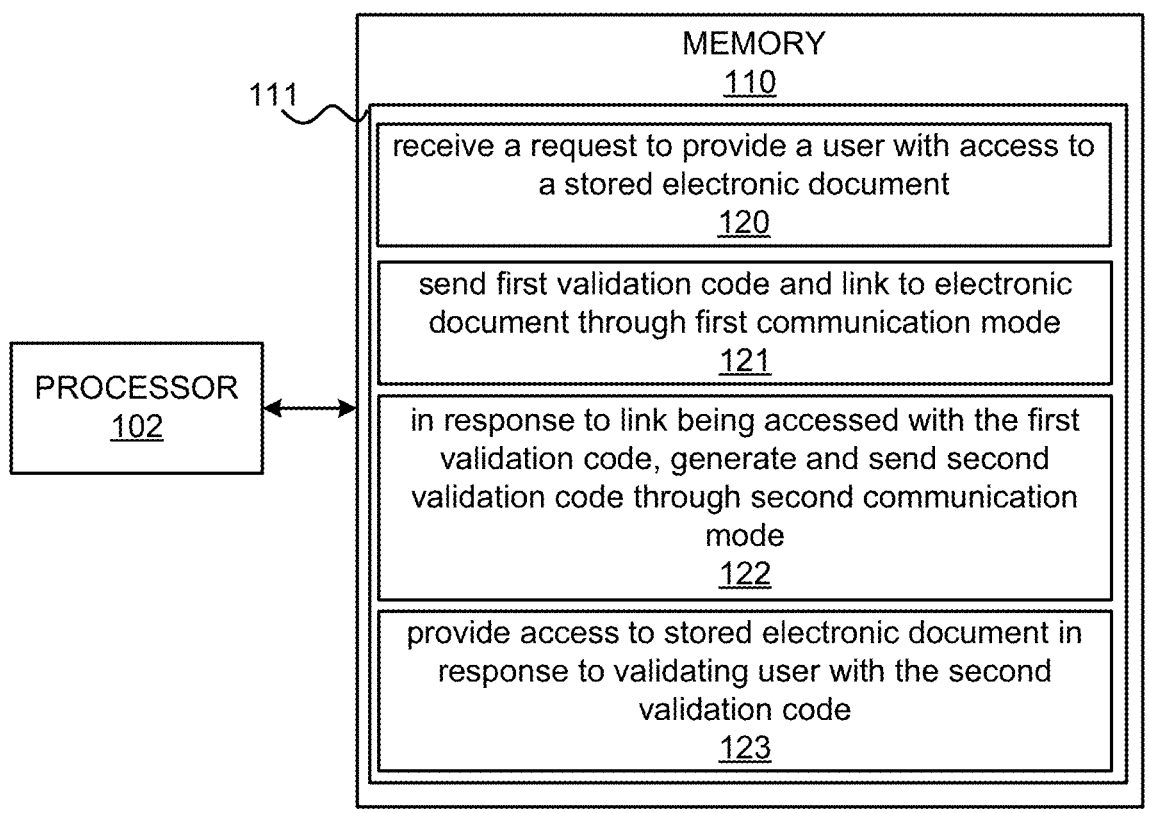
FIG. 1 illustrates a document management computer system, according to an example.

For simplicity and illustrative purposes, the principles of the embodiments are described by referring mainly to examples thereof. In the following description, numerous specific details are set forth in order to provide an understanding of the embodiments. It will be apparent, however, to one of ordinary skill in the art, that the embodiments may be practiced without limitation to these specific details. In some instances, well known methods and/or structures have not been described in detail so as not to unnecessarily obscure the embodiments.

According to an example of the present disclosure, a document management system can provide a user with access to a stored electronic document through a multi-modal communication and validation process. Accessing an electronic document may include reading, writing, retrieving, storing and/or modifying the electronic document. An electronic document may include electronic media content (e.g., other than computer programs or system files) that are intended to be used in either an electronic form or as printed output. By way of example, electronic documents may include .pdf files, .doc, slides, images, audio files, multimedia content, web pages, blogs, etc. Multi-modal communication may include sending and/or receiving messages through different communication modes. A communication mode may include a form of electronic communication used by a computer to send a message to another computer. Examples of different communication modes may include email, text, voice calls, social media messaging, etc.

The multi-modal communication and validation process may validate a user to allow the user to access an electronic document stored in the document management system. According to an example, a first user that is authorized to access an electronic document in the document management system may provide a second user with access to the electronic document. The second user may be validated through the multi-modal communication and validation process before being provided with access to the electronic document stored in the document management system. Furthermore, the second user may be validated without having to register the second user with an internal or external directory used by the document management system or the document management system to authenticate the second user to allow access to electronic documents in the document management system.

In an example, the first user of the document management system may be an internal user of an organization having the document management system. The first user may be an employee of the organization. The first user may be a user registered in a directory of the organization. Credentials for the first user may be stored in the directory for authenticating the first user to allow access to the document management system or other enterprise systems of the organization. A directory may include a collection of users, user passwords, and, information about what resources, such as applications, network resources, etc., they can access. An organization may maintain a directory for its employees to control employee access to the resources of the organization. For example, Active Directory® by Microsoft® may be used for the directory or another type of directory including a directory that may use Lightweight Directory Access Protocol (LDAP) directory services may be used.

The first user may be authenticated according to credentials in the directory to access electronic documents in the document management system. The first user may desire to provide the second user with access to a stored electronic document in the document management system. The second user may be an external user that is not part of the organization and may not be registered in the directory. For example, the second user may be a contractor for the organization, and is working with the first user. In these situations, in order for the first user to share an electronic document stored in the document management system with the second user, the second user is typically added to the directory of the organization, and/or, a second instance of the document management system may be maintained, which is external facing and allows external users to access documents stored therein, for additional security. However, in many instances, the second user is desired to have temporary access, so the system administrator has to remove the second user from the directory after a short period of time. The adding and removing of users to the directory is time-consuming, especially when there are many external users for which access is being managed. Also, if a system administrator forgets to remove an external user from the directory, it may create a security risk. Also, it is costly to maintain the directory and to maintain an external facing document management system. The document management system, according to an example of the present disclosure, can provide the second user, which may be an external user, with access to a stored electronic document in the document management system without registering the second user in the directory, as is further discussed below.

FIG. 1 shows an example of a document management computer system 100. It should be understood that the document management computer system 100 depicted in FIG. 1 may include additional components without departing from a scope of the document management computer system 100 disclosed herein.

The document management computer system 100 may include a processor 102 and a memory 110 on which is stored machine readable instructions 111 that the processor 102 may fetch and execute. The processor 102 may be a semiconductor-based microprocessor, a central processing unit (CPU), an application specific integrated circuit (ASIC), a field-programmable gate array (FPGA), and/or other hardware device. The memory 110 may be an electronic, magnetic, optical, or other physical storage device that stores the machine readable instructions 111. The memory 110 may be, for example, Random Access Memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals. The processor 102 may include multiple processors.

The processor 102 may fetch and execute the machine readable instructions 111 to perform a multi-modal communication and validation process to validate a user and provide access to an electronic document. Examples of the machine readable instructions 111 are shown as machine readable instructions 120-123. For example, the processor 102 may fetch and execute the machine readable instructions 120 to receive a request to provide a user with access to an electronic document. The electronic document may be stored in file repository or another type of storage system that stores electronic documents that can be shared by multiple users. In an example, the request may be from a first user, such as an internal user, requesting that access to the electronic document be provided to a second user, which may be an external user. The request may include contact information for the second user. The contact information may include an identifier of the second user and user contact information facilitating contacting the second user via a plurality communication modes, such as an email address for the second user, a telephone number of the second user for receiving voice calls, a mobile phone number of the second user for receiving text messages, etc. The first user may have credentials stored in a directory to authenticate the first user in order to provide the first user with access to the document management computer system 100 and electronic documents managed by the document management computer system 100, but the second user may not have such credentials.

The processor 102 may fetch and execute the machine readable instructions 121 to send a first validation code and a link to the electronic document through a first communication mode to the second user. For example, a first message is generated that includes the first validation code, and the first message is transmitted to the second user through the first communication mode. In an example, the first communication mode is email. The email address of the second user is determined from the contact information of the second user which may be provided with the request. An email is generated that is addressed to the email address of the second user. The email may include the first validation code and a link to the electronic document. The link may be an address or uniform resource locator (URL) of the electronic document. The email is sent to the second user. The multi-modal communication and validation process may be used to validate multiple different users, and for each user and each electronic document, a unique validation code and URL for the electronic document may be generated and sent to the user.

The processor 102 may fetch and execute the machine readable instructions 122 to generate and send a second validation code through a second communication mode in response to the link being accessed with the first validation code. For example, the second user visits the URL of the electronic document by clicking on the link in the email. The second user is prompted to enter a validation code while visiting the URL, and the user enters the first validation code from the email. The processor 102 compares the validation code entered by the second user with the first validation code to determine if the codes match. If the codes match, the second validation code is generated. Also, the second validation code is sent in a second message to the second user through the second communication mode. In an example, the second communication mode is text messaging, and a text message is sent to the second user's mobile number and includes the second validation code.

The processor 102 may fetch and execute the machine readable instructions 123 to provide the second user with access to the stored electronic document in response to validating the second user with the second validation code. For example, the second user receives the second validation code in the text message. While visiting the URL, the second user is prompted to enter another validation code, which should be the second validation code sent in the text message. The second validation code, which may be entered by the second user, is received, and compared to the second validation code generated at 122. The processor 102 compares the received validation code with the previously-generated second validation code to determine if the codes match. If the codes match, the second user is validated and provided access to the electronic document.

The first and second validation codes may be temporary. For example, the first and second validation codes may be valid for a predetermined period of time, which may be start from the time the codes are generated. In an example, the first validation code may be valid for 12 hours or 24 hours. The second validation code may be valid for a shorter period of time, such as five minutes. After expiration of the predetermined period of time for the first or second validation codes, the code is invalid. For example, the processor 102 may determine whether the first and second validation codes are expired, and if the codes are expired, they cannot be used to validate a user. In an example, the first and second codes may be randomly generated by a random number generator or a pseudo-random number generator or may be generated according to a hash function. Also, the first and second validation codes may be unique to a specific user and electronic document for which access is being granted.

Figure 2:
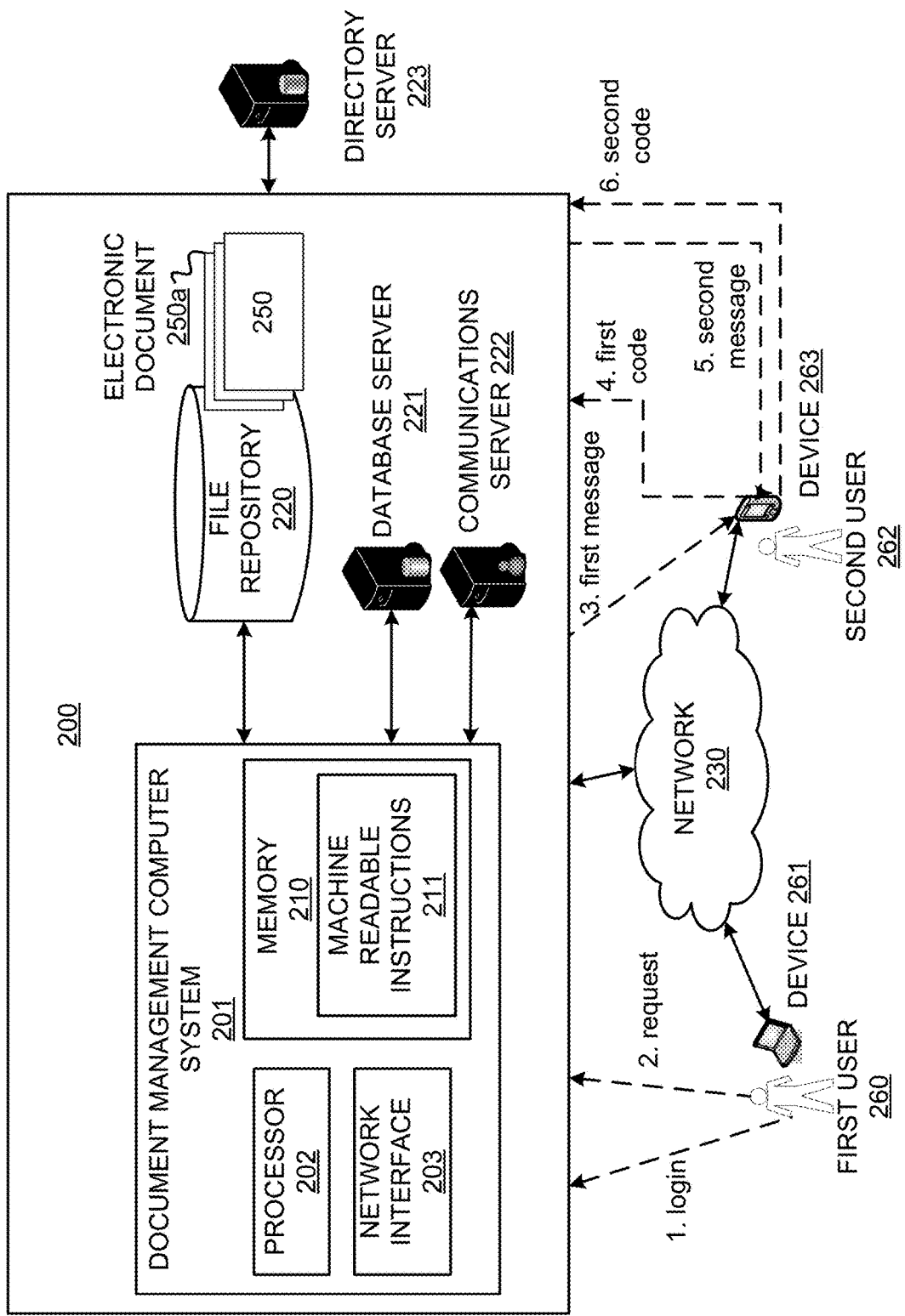
FIG. 2 illustrates a document management system, according to an example.

FIG. 2 shows an example of a document management system 200. The document management system 200 may include a document management computer system 201 and a file repository 220 to store electronic documents 250. The document management computer system 201 may include the same or similar components of the document management computer system 100. For example, the document management computer system 201 may include processor 202 and memory 210, and machine readable instructions 211 stored in the memory 210 and executable by the processor 202. The machine readable instructions 211 may include the instructions 120-123 and/or other machine readable instructions to perform operations and functions described herein, including document management operations. Network interface 203 may include hardware and/or software to enable the processor 202 to send and receive information over a network, such as the network 230 or other networks.

The document management system 200 may include a file repository 220 to store electronic documents 250. The file repository 220 includes data storage for storing the electronic documents 250. The data storage may include networked data storage technologies or other types of data storage technologies. The document management computer system 201 may perform document management operations on the stored electronic documents including tracking, managing and storing the electronic documents 250, and additionally, the document management computer system 201 may provide access to the electronic documents 250 through a multi-modal communication and validation process, which is discussed below.

The document management system 200 may include other computer systems. For example, the document management system 200 may include a database server 221 and a communications server 222. The database server 221 may store database tables. The database tables may include a table to store user contact information and validation codes. The communications server 222 may be used to send messages to users for validation. Examples of the communications server 222 may include an email server, a one-time password (OTP) server, a text messaging server, etc.

The document management system 200 may communicate with users, such as electronic devices and computers of users, over network 230. Communicating with users may include sending and receiving messages over the network 230 through a plurality of communication modes. The computer network 230 may include a group of computer systems and other computing hardware devices that are linked together through communication channels to facilitate communication between a wide range of users.

The document management computer system 201 may execute the machine readable instructions 211 to perform the multi-modal communication and validation process. The multi-modal communication and validation process may include invoking the sending of messages, including first and second validation codes, to a second user at different times via a plurality of communication modes; receiving codes responsive to sending the messages; comparing the received codes to the first and second validation codes to validate the second user; and providing the second user with access to the stored electronic document if the received codes match the first and second validation codes. FIG. 2 shows examples of messages exchanged between the document management system 200 and electronic devices 261 and 263 of first and second users 260 and 262 for validating the second user 262 to provide access to an electronic document, such as electronic document 250a. The exchanged messages are shown as dashed lines 1-6 but the messages may be transmitted and received through the network 230 or through other communication channels. The message exchange may be part of the multi-modal communication and validation process. The electronic devices 261 and 263 of the first and second users 260 and 262 may include desktops, laptops, smartphones, tablets or other types of end user devices or computers.

The exchanged messages 1-6 are for validating the second user 262 to provide access to electronic document 250a stored in the file repository 220. In this example, the first user 260 is a registered user of the document management system 200 (e.g., an internal user), and the second user 262 (e.g., an external user) may not be a registered user of the document management system 200.

Dashed line 1 represents the first user 260 logging into the document management system 200. For example, the first user 260 is a registered user that has its credentials, such as login ID and password and access rights, stored in the directory server 223. The directory server 223 may store a directory of credentials and access rights for registered users. The directory server 223 may include directory services that allows the document management system 200 to authenticate registered users. For example, the first user 260 logs into the document management system 200 by providing its login ID and password to the document management system 200 via the electronic device 261. The document management system 200 may authenticate the first user 260 through the directory services provided by the directory server 223 and allow access to certain electronic documents in the file repository based on the access rights stored for the first user 260.

Dashed line 2 represents a request sent by the first user 260 to the document management system 200 to request that access to the electronic document 250a be provided to the second user 262. The request includes user contact information for the second user 262, such as name, email, mobile number, etc., for facilitating contacting the second user 262 via a plurality communication modes. In an example, the first user 260 has access rights to access the electronic document 250a. The first user 260 accesses the electronic document 250a through the document management system 200. The machine readable instructions 211 may include a script that generates an option for a user to request access for another user. For example, the first user 260 accesses the electronic document 250a through a graphical user interface (GUI) generated by the document management computer system 201. The document management computer system 201 may generate the GUI and include an option for the first user 260 to request access to the electronic document 250a for the second user 262, which is not registered in the directory server 223. The first user 260 generates the request by selecting the option and by providing the user contact information for the second user 262.

The document management computer system 201 receives, from the electronic device 261 of the first user 260, the request to provide access to the electronic document 250a for the second user 262 and the user contact information for the second user 262. The document management computer system 201 may store information for the request in a table. The information for the request may include the user contact information for the second user 262 (e.g., email address and mobile phone number) and the requested privileges for the second user 262, such as an identifier of the electronic document 250a and requested access privileges for the second user 262 to access the electronic document 250a. In an example, database server 221 may include a database table storing request information for a plurality of requests received from users. An entry may be created in the table for the request received from the first user 260, and the entry may include the request information.

Also, in response to receiving the request from the first user 260, the document management computer system 201 may generate a first validation code for validating the second user 262. The first validation code may be stored in the table entry in the database server 221, along with the request information. The first validation code may be unique to the user and the electronic document 250a. A hash function or a random number generator may be used to generate the first validation code. The first validation code may be temporary and the table entry may store the expiration time of the first validation code.

Dashed line 3 represents a first message sent from the document management system 200 to the electronic device 263 of the second user 262. The first message is sent through a first communication mode and includes the first validation code. For example, the table entry in the database server 221 for the received request includes contact information for the second user 262 that enables the document management computer system 201 to send messages to the second user 262 through a plurality of communication modes. The document management computer system 201 selects a communication mode, such as email, and invokes generation of an email to be sent to the second user 262. The email includes the first validation code and includes a link, such as a URL, to the electronic document 250*a*. The communications server 222 may send the email to the second user 262, and the second user 262 may receive the email on the electronic device 263. Email is one example of a communication mode that may be selected. Other types of communication modes may be selected depending on the contact information, such as email address, mobile phone number, etc., provided for the second user 262.

The second user 262 may receive the email on the electronic device 263, and click on the link in the email to attempt to access the electronic document 250*a*. Clicking the link, for example, directs the second user 262 to the URL for the electronic document 250*a*, such as via a browser, and prompts the second user 262 to enter a validation code for accessing the electronic document 250*a*. The second user 262 should enter the first validation code provided in the email. Dashed line 4 represents the second user 262 accessing the link, and sending a first code to the document management system 200. The first code is the first validation code provided in the first message provided at dashed line 3, such as the email including the link and the first validation code.

The document management computer system 201 receives the first code represented by dashed line 4, and compares the first code to the validation code stored in the table entry in the database server 221, along with the request information. If the first code matches the first validation code, the document management computer system 201 generates a second validation code. The second validation code may be stored in the table entry in the database server 221. The second validation code may be unique to the user and the electronic document 250*a*. A hash function or a random number generator may be used to generate the second validation code. The second validation code may be temporary and the table entry may store the expiration time of the second validation code.

The second validation code is sent through a second communication mode that is different from the first communication mode. For example, dashed line 5 represents a second message sent from the document management system 200 to the second user 262 through the second communication mode, and the second message includes the second validation code. In an example, the second message is a text message sent to the mobile phone of the second user 262. For example, if the first code matches the first validation code, the document management computer system 201 generates the second validation code, retrieves the mobile phone number of the second user 262 from the table in the database server 221, and instructs the communications server 222 to send a text message with the second validation code to the second user 262. The second user 262 is prompted to enter the second validation code after entering the first validation code, assuming the first code matched the first validation code while accessing the URL for the electronic document 250*a*. Dashed line 6 represents the second user 262 entering a second code, which should be the second validation code received in the second message, such as the text message.

The document management computer system 201 receives the second code, and compares the second code to the second validation code that was previously generated and sent to the second user 262. If the second code matches the second validation code, the document management computer system 201 provides the second user 262 with access to the electronic document 250*a*. The second user 262 may be able to retrieve the electronic document 250*a* and modify the electronic document 250*a*.

Figure 3:
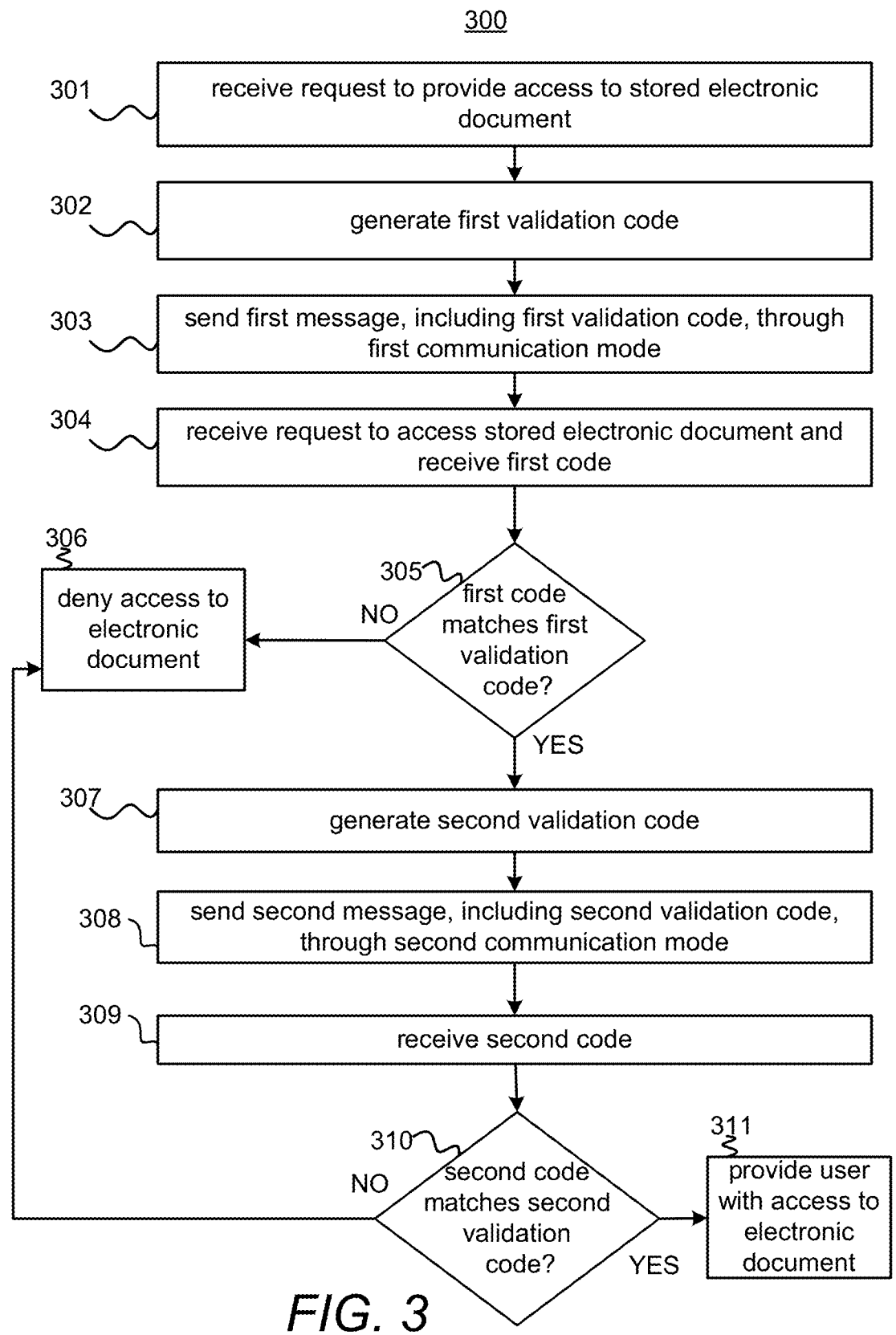
FIG. 3 illustrates a method, according to an example.

FIG. 3 illustrates a method 300 according to an example. The method 300 may be performed by a computer, such as the document management computer system 100 or the document management computer system 201 and/or another computer. The method 300 may be performed by at least one processor executing machine readable instructions, such as described above with respect to the document management computer system 100 and the document management computer system 201. The method 300 may be an example of the multi-modal communication and validation process. By way of example, the method 300 is described with respect to the document management system 200 shown in FIG. 2.

At 301, a request is received to provide a user with access to a stored electronic document, such as described with respect to dashed line 2 shown in FIG. 2. At 302, a first validation code is generated to validate a user, such as the second user 262 shown in FIG. 2. At 303, a first message, including the first validation code, is sent to the user through a first communication mode, such as described with respect to dashed line 3 shown in FIG. 2. At 304, a request is received for the user to access the stored electronic document, wherein the request includes a first code, such as described with respect to dashed line 4 shown in FIG. 2. For example, the received request occurs when the second user 262 clicks on the link in the received email, and then the second user provides the first code to the document management computer system 201. At 305, a determination is made as to whether the first code matches the first validation code. If the first code does not match the first validation code, then access to the electronic document by the user is denied at 306. If the first code matches the first validation code, then a second validation code is generated to validate the user at 307. At 308, a second message is sent to the user through a second communication mode different from the first communication mode, and the second message includes the second validation code, such as described with respect to dashed line 5 shown in FIG. 2. At 309, a second code is received, such as described with respect to dashed line 6 shown in FIG. 2. At 310, a determination is made as to whether the second code matches the second validation code. If the second code does not match the second validation code, then access to the electronic document by the user is denied at 306. If the second code matches the second validation code, then the user, such as second user 262, is provided access to the electronic document at 311.

While the embodiments have been described with reference to examples, those skilled in the art will be able to make various modifications to the described embodiments without departing from the scope of the claimed embodiments.

What is claimed is:

1. A document management computer system comprising:
   at least one processor;
   a memory having stored thereon machine readable instructions which, when executed by the at least one processor, causes the system to:

receive a request from a first user authorized to access a stored electronic document to provide a second user with access to the stored electronic document on the document management computer system having a directory of registered users, wherein the second user is not registered in the directory, wherein the request includes user contact information facilitating contacting the second user via a plurality of communication modes;

send a first message to the second user according to the user contact information through a first communication mode of the plurality of communication modes, wherein the first message includes a first validation code and a link to the stored electronic document, wherein the link is associated with at least one of an address or a uniform resource locator associated with the stored electronic document;

in response to the link being accessed with a first code matching the first validation code by an electronic device associated with the second user, generate a second validation code, and send a second message to the user according to the user contact information through a second communication mode of the plurality of communication modes, wherein the second message includes the second validation code; and in response to determining that a second code from the second user matches the second validation code, provide access to the stored electronic document without having to register the second user in the directory.

2. The document management computer system of claim 1, wherein at least one of the first validation code and the second validation code are valid for a temporary period of time from being generated.

3. The document management computer system of claim 1, wherein in response to receiving the request, the system is caused to:
store the user contact information in an entry in a table;
generate the first validation code; and
store the first validation code in the table entry for the user contact information.

4. The document management computer system of claim 3, wherein the link is accessed by the electronic device, and the system is caused to:
receive the first code from the electronic device;
identify the user associated with the received code;
retrieve the first validation code from the table based on the identified user;
determine whether the received code from the electronic device matches the first validation code;
in response to the received code matching the first validation code, send the second message; and
in response to the received code not matching the first validation code, deny access to the stored electronic document.

5. The document management computer system of claim 4, in response to the received code matching the first validation code, the system is caused to:
generate the second validation code; and
send the second message with the second validation code.

6. The document management computer system of claim 5, wherein the system is caused to:
receive the second code in response to sending the second message;
determine whether the second code matches the second validation code;
in response to the second code matching the second validation code, allow access to the stored electronic document; and
in response to the second code not matching the second validation code, deny access to the stored electronic document.

7. The document management computer system of claim 5, wherein the second validation code is randomly generated in response to the received code matching the first validation code.

8. The document management computer system of claim 1, wherein the plurality of communication modes comprise a plurality of email, text, and voice call.

9. A computer-implemented method for electronic document access management, the method executed by at least one processor and comprising:
receiving a request from a first user authorized to access a stored electronic document to provide a second user with access to the stored electronic document on a document management system having a directory of registered users, wherein the second user is not registered on the directory;
generating a first validation code to validate the second user;
sending a first message, including the first validation code and a link to the stored electronic document, to the second user through a first communication mode, wherein the link is associated with at least one of an address or a uniform resource locator associated with the stored electronic document;
receiving a request for the second user to access the stored document, wherein the request includes a first code;
determining whether the first code matches the first validation code;
if the first code matches the first validation code, generating a second validation code to validate the second user;
sending a second message to the second user through a second communication mode different from the first communication mode;
receiving a second code responsive to the sending of the second message;
determining whether the second code matches the second validation code; and
if the second code matches the second validation code, providing the second user with access to the stored electronic document without having to register the second user in the directory.

10. The computer-implemented method of claim 9, wherein at least one of the first validation code and the second validation code are valid for a temporary period of time from being generated.

11. The computer-implemented method of claim 9, wherein the first and second communication modes comprise at least one of email, text, and voice call.

12. The computer-implemented method of claim 9, wherein if the first code does not match the first validation code or the second code does not match the second validation code, denying the second user access to the stored electronic document.

13. The computer-implemented method of claim 9, wherein receiving a request comprises receiving the request from the first user authorized to access the stored electronic document, and the request is for providing the second user with access to the stored electronic document.

14. A document management system comprising:
at least one processor;

a memory having stored thereon machine readable instructions which, when executed by the at least one processor, causes the system to:

receive a request from a first user of the document management system to provide a second user with access to a stored electronic document, wherein the first user is a registered user registered in a directory of registered users used for the document management system with privileges to access the stored electronic document via the document management system, and the second user is not a registered user in the directory and does not have the privileges to access the stored electronic document via the document management system;

invoke sending first and second messages, associated respectively with first and second validation codes, to the second user at different times via a plurality of communication modes associated respectively with the first and second messages, wherein the first message includes a link to the stored electronic document, wherein the link is associated with at least one of an address or a uniform resource locator associated with the stored electronic document;

receive codes responsive to sending the messages;

compare the received codes to the first and second validation codes to validate the second user; and providing the second user with access to the stored electronic document without having to register the second user in the directory if the received codes match the first and second validation codes.

15. The document management system of claim 14, wherein the plurality of communication modes comprise a plurality of email, text, and voice call.

* * * * *